No. 799,639. PATENTED SEPT. 19, 1905.
J. A. DULIN.
COMBINED FLY NET AND REIN GUARD.
APPLICATION FILED DEC. 12, 1904.

Witnesses;
L. Shute.
L. B. Koerner.

Inventor,
John A. Dulin,
By Minturn & Woerner,
ATTORNEYS.

UNITED STATES PATENT OFFICE.

JOHN A. DULIN, OF LEBANON, INDIANA.

COMBINED FLY-NET AND REIN-GUARD.

No. 799,639.        Specification of Letters Patent.        Patented Sept. 19, 1905.

Application filed December 12, 1904. Serial No. 236,623.

*To all whom it may concern:*

Be it known that I, JOHN A. DULIN, a citizen of the United States, residing at Lebanon, in the county of Boone and State of Indiana, have invented certain new and useful Improvements in Fly-Nets and Guards to Protect Driving-Lines from Horses' Tails, of which the following is a specification.

This invention relates to improvements in means for protecting horses while hitched to a vehicle from flies and to prevent the animal from getting its tail over the lines; and the object of the invention is to provide a neat and durable device that will not interfere in the operations of hitching and unhitching the horse from the vehicle and that will allow the vehicle-shafts to be raised in the usual way without interference from the invention.

I accomplish my objects by the mechanism illustrated in the accompanying drawings, in which—

Figure 1:
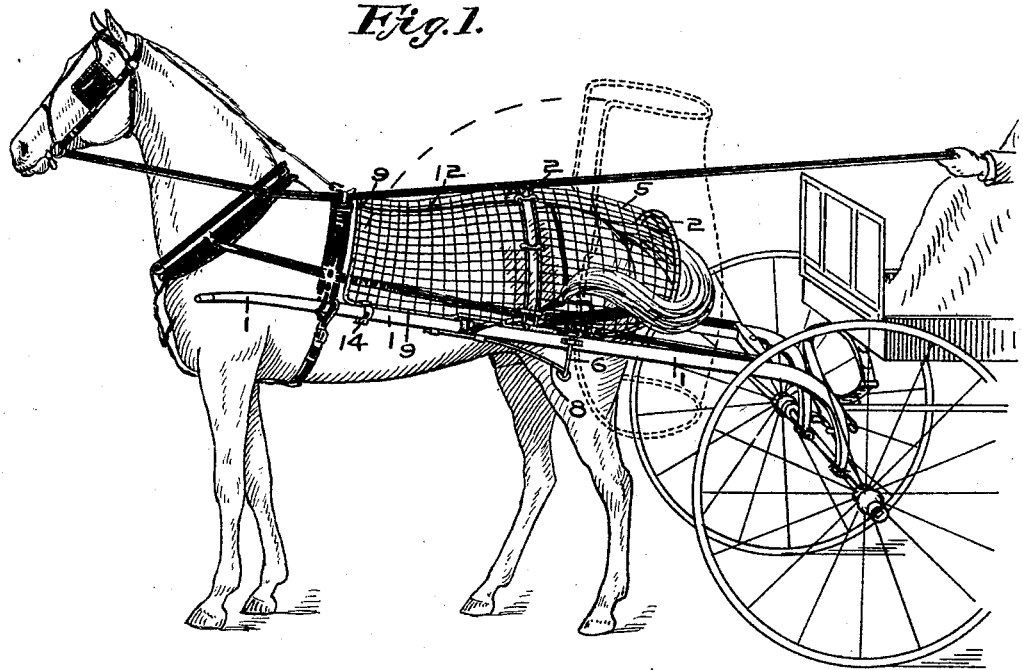
Figure 2:
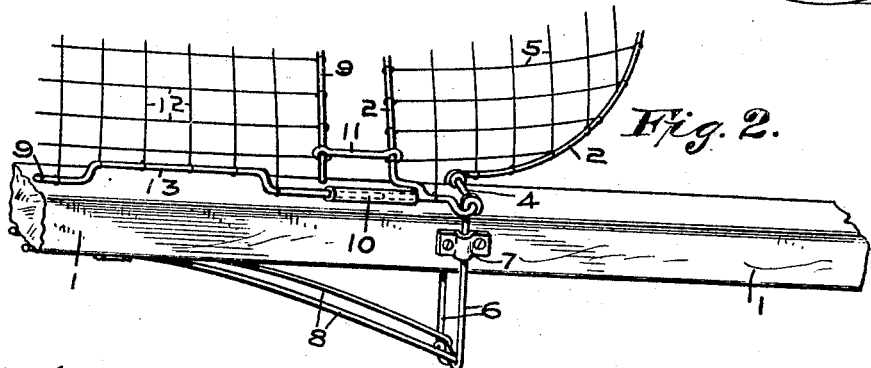

Figure 1 is a perspective view of a buggy having a horse hitched thereto and showing my invention in operative position. This figure shows the position of my invention in dotted lines when the latter is raised into a vertical position in hitching or unhitching the horse. Fig. 2 is a detail in perspective, showing one of the shafts and the mechanism for adjustably securing the invention to the shaft.

Like characters of reference indicate like parts throughout both the views of the drawings.

1 represents the shafts of a vehicle of usual construction.

2 is a frame-wire for the rear portion of my improved guard, which rests for a portion of its length upon the opposite members of the pair of shafts and passes in a vertical plane in an arch over the back of the horse from one shaft to the other. The portions of said frame lying upon the shafts are continued in a backward direction a suitable distance to the rear of the horse with an inward and upward curve, which forms an arch to the rear of and over the animal's tail. The space between the two arched members of this frame is filled in with a suitable network of woven wires 5. The portion of the frame 2 lying upon the shafts is bent outwardly and continued past the outer side of the shaft and is then bent inwardly to form the members 4 transversely of the shaft, which serves as a means for securing the frame in a hinged manner to the shaft.

6 represents wire loops in the form of the letter U, the stems of which are placed upon each side of a shaft and have their upper ends secured to the member 4 of the frame by being bent around said member in the manner as shown in Fig. 2, thereby forming a hinged connection between the said frame and loop 6. The stems of the loop are secured to the sides of the shaft by means of the plates 7, which prevent the removal of the loops, while permitting of their vertical adjustment. Secured to the under side of each shaft are the springs 8, which have their outer ends secured to the cross-bar of loop 6. The tendency of springs 8 is to force the loop to which they are attached in a downward direction, thereby holding the frame 2 normally in contact with the shaft. The adjustment of the frame 2 in a vertical direction, afforded by the loops 6 and springs 8, is to allow for the settling down of the shaft without causing the guard to bind upon the horse or injure the guard when the vehicle is lowered, as by one or both of the wheels dropping into a rut in the road.

9 is a frame having a horizontal member which lies upon the vehicle-shafts on each side of the horse and which has members arched in an upward direction that pass over the horse and connect with horizontal members. The space inclosed by this frame is filled in with woven wire 12 in the manner as shown. This woven wire in both of the frames above described may be fine enough to prevent the access of flies to the horse, or the mesh may be open and serve as a support for the usual fly-netting made out of woven fabric. The lower member of the frame 2 is provided with the sleeves 10 to receive a suitable end from the frame 9, whereby the horizontal members of both frames are removably united. These frames are additionally joined together by means of the links 11, which are formed from short pieces of wire, with their ends bent around the adjacent arched members of the two frames. The horizontal members of frame 9 are bent up at 13 to prevent contact of said frame with the holdback-straps of the harness.

14 is a clamp which is passed around the lower member of the frame 9 and around the shaft 1 for the purpose of holding the frame down upon the shafts while in use on the horse.

In hitching up the horse to the vehicle and unhitching it the above-described guard is raised into the position shown in dotted lines in Fig. 1, so as not to interfere in said operation, the clamp 14 being of spring metal, open at its lower portion, so as to be readily placed around and removed from its shaft.

The two frames above described might readily be made all in one; but I prefer to make this two-part frame so as to permit of the removal of the frame 9 and its netting, which covers the major portion of the body of the horse during those seasons of the year when there are no flies to bother the animal. This leaves the rear frame 2 in use to act as a guard to prevent the animal from getting his tail over the line, as some horses form this vicious habit and continue it during the entire year. When the front frame 9 is removed, the clamp 14 is moved back to engage the sleeves 10 and hold the frame 2 from tilting on its hinge 4.

The invention is capable of various modifications without departing from the spirit thereof, and I therefore do not desire to be limited to the exact device shown; but What I do claim as new, and wish to secure by Letters Patent of the United States, is—

1. In a device for the purpose as specified, a frame supported by the shafts of the vehicle having curved members passing over the back of the animal hitched thereto, one of said curved members being supported directly upon the shafts and crossing over the hips of the animal, and a filling of suitable material carried by said frame.

2. In a fly-screen and line-guard, a stiff metal frame having horizontal members resting upon the vehicle-shafts, said horizontal members extending along the sides of the animal and connected by arch members extending over the back of the animal, and a filling of wires between the members of said frame.

3. In a fly-screen and line-guard, a wire frame having horizontal members which rest upon and are hinged to the vehicle-shafts, and curved members connecting said horizontal members, said curved members passing over the back of the animal, one of said curved members being to the rear of the animal, and a filling of suitable material between the members and the frame.

4. In a fly-screen and line-guard, a shield passing over the back of the animal and to its rear, hinges for securing the shield to the shafts to permit the shield to be raised, means for securing it in its normal lower position, and means for permitting an adjustment of the distance between the shield and its support.

5. In a fly-screen and line-guard, a shield supported by the shafts of the vehicle, said shield passing in an arch over the back of the animal and extending to the rear of the animal, said shield being in two transversely-separable parts.

6. In a fly-screen and line-guard, a shield comprising a rigid metal frame with a woven-wire filling, said frame having members resting upon the vehicle-shafts and transversely crossing said shafts, U-shaped loops having their ends wrapped around the said transverse frame members, and springs to depress said loops.

7. In a fly-screen and guard, a shield comprising a rigid metal frame in two transversely-separable parts, said parts having a woven-wire filling, a sleeve on one frame to receive entering wires from the other frame, and other fastening means such as wire links additionally connecting said frames, the rear section of the frame projecting to the rear of the animal, said section being hinged to the vehicle-shafts, and clamps to removably secure the front ends of the frame to said shaft.

In witness whereof I have hereunto set my hand and seal, at Indianapolis, Indiana, this 14th day of November, A. D. 1904.

JOHN A. DULIN. [L. S.]

Witnesses:
 F. W. WOERNER,
 J. A. MINTURN.